United States Patent [19]

Szabo et al.

[11] 3,778,794

[45] Dec. 11, 1973

[54] ANALOG TO PULSE RATE CONVERTER

[75] Inventors: Andras I. Szabo, Export; William E. Zitelli, Pittsburgh; Dan V. Tarli, North Versailles, all of Pa.

[73] Assignee: Westinghouse Electric Corporation, Pittsburgh, Pa.

[22] Filed: Sept. 18, 1972

[21] Appl. No.: 290,052

[52] U.S. Cl........... 340/174.1 A, 307/229, 307/271, 307/295, 328/127

[51] Int. Cl........................... H03k 1/10, G11b 5/00

[58] Field of Search.................... 307/229, 233, 261, 307/264, 271, 295; 328/127; 340/174.1 A, 174.1 G

[56] References Cited

UNITED STATES PATENTS

| | | | |
|---|---|---|---|
| 3,245,004 | 4/1966 | Anderson et al. | 307/271 |
| 3,274,501 | 9/1966 | Heinsen | 307/229 |
| 3,350,574 | 10/1967 | James | 307/261 |
| 3,389,271 | 6/1968 | Gray | 307/271 |
| 3,419,784 | 12/1968 | Winn | 307/271 |
| 3,482,116 | 12/1969 | James | 307/261 |
| 3,560,864 | 2/1971 | Nihof | 307/229 |
| 3,594,649 | 7/1971 | Rauch | 307/271 |
| 3,628,064 | 12/1971 | Camenzind et al. | 307/271 |
| 3,660,782 | 5/1972 | Friedman et al. | 307/271 |
| 3,639,843 | 2/1972 | Schmidhauser | 328/127 |

*Primary Examiner*—Stanley D. Miller, Jr.
*Attorney*—A. T. Stratton et al.

[57] ABSTRACT

An analog to pulse rate converter includes an integrator circuit in which the integrator capacitor is charged at a rate corresponding to the level of an input signal. A logic control circuit causes the capacitor to discharge at a fixed rate during a fixed portion of the clock period whenever the capacitor charges above a predetermined charge level. Output pulses occur during each discharge cycle. The average frequency of the output pulses indicates the level of the input signal.

6 Claims, 4 Drawing Figures

ANALOG TO PULSE RATE CONVERTER

BACKGROUND OF THE INVENTION

This invention relates to an improved analog to pulse rate converter and more particularly to such a converter for receiving slowly varying transducer signals and producing corresponding pulse signals especially suitable for monitoring or recording over long time periods.

In one general type of analog to pulse rate converter, the repetition rate of output pulses is varied in response to the level of an input voltage by a free running multivibrator including two timing capacitors connected to a pair of cross-coupled bistable switching devices. A current source is connected to one of the timing capacitors and is held constant to provide a reference while the other current source is varied to correspond to the level of the input voltage. The frequency of the multivibrator is then varied to produce pulses at a rate corresponding to the level of the input voltage. This circuit arrangement is known to experience a frequency drift as the components age and is sensitive to temperature fluctuations requiring high precision and expensive components. Also when the arrangement is used where there is a slow output pulse rate, large capacitors are required which are not desirable nor practical in some applications.

Another known circuit arrangement is to provide an integrator circuit in which the integrator capacitor is charged by the level of the input signal. A comparator circuit is used to sense the charge level of the capacitor. A one-shot multivibrator is connected in a discharge circuit to the capacitor so as to remove a predetermined charge whenever a reference charge level is reached. The output pulse rate from the one-shot multivibrator then provides an indication of the level of the input signal. It is known that the pulse width of a one-shot multivibrator may be likely to drift due to temperature changes and aging of the circuit components and therefore require expensive components which in some applications are neither desirable nor practical.

SUMMARY OF THE INVENTION

In accordance with the present invention an analog to pulse rate converter includes an integrator circuit for changing the integrator capacitor at a rate proportional to the level of a slowly varying input signal to be converted. A solid state switch connects the capacitor to a discharge circuit and is selectively rendered conductive in combined response to a decision control logic and a source of synchronizing clock pulses. The decision control logic is responsive to a predetermined charge level on the integrator capacitor and also the clock pulses. A discharge control signal is initiated from the decision control logic to render the solid state switch operative for a fixed portion of the clock pulse period. These fixed clock pulse portions define equal discharge cycles to remove equal predetermined amount of capacitor charge when a discharge control signal is generated. The average frequency of the discharge cycles is an indication of the level of the input signal. Further sealing of the output pulse rate can be accomplished by the addition of a digital frequency divider circuit.

It is a general feature of this invention to provide an improved analog to pulse rate converter for receiving slowly varying input signals which are to be monitored over long time intervals.

Another feature of this invention is to provide an analog to pulse rate converter having an integrator circuit capacitor charged to a predetermined charge level in response to the level of an input signal and discharging the capacitor during discrete intervals under the control of a source of clock pulses such that the average frequency of such discharge cycles is an indication of the input signal level.

A further feature of this invention is to provide an analog to pulse rate converter in which the charge on an integrator capacitor is balanced over a long period of time. The capacitor is discharged by an amount equal to the charge supplied by the voltage level of an input signal so that variations in a predetermined charge level at which the capacitor charge is balanced does not effect the output pulse rate. The use of a comparator to detect the predetermined charge level further decreases the effect of time and temperature variations of the circuit components on the accurary of the output pulse rate.

A still further feature of this invention is to provide an analog to pulse rate converter in which the charge on an integrator capacitor is balanced by discharge cycles controlled by fixed portions of clock pulses with the output pulses being responsive to each discharge cycle with the average frequency of the output pulses being determined with respect to a time base interval synchronized with the clock pulses so that common variations in the clock pulses and time base interval occur without varying the output pulse rate. This feature is advantageously used in data totalization and recording systems when accumulating the output pulses between reference time intervals.

These and other features and advantages of the present invention will become apparent from the description of the drawings.

DESCRIPTION OF THE PREFERRED EMBODIMENTS

Figures 1, 2:
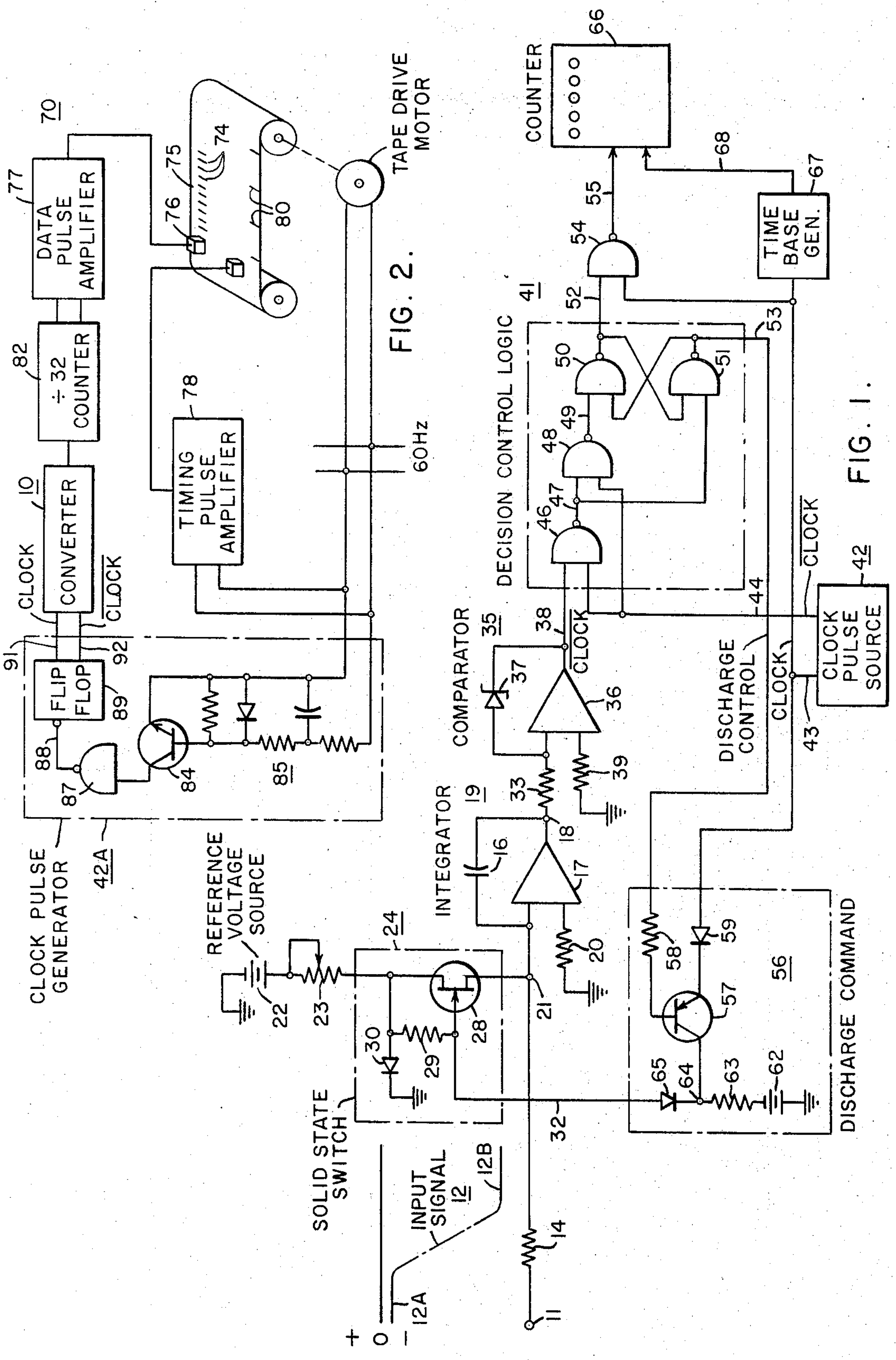
FIG. 1 is a schematic circuit diagram of an analog to pulse rate converter made in accordance with this invention.
FIG. 2 is a block diagram of a data totalizing system utilizing the analog to pulse rate converter shown in FIG. 1 and further showing a circuit diagram of a clock pulse source utilized in the data totalizing system.

Referring now to the drawings and more particularly to FIG. 1 wherein there is shown a schematic circuit diagram of the analog to pulse rate converter 10 made in accordance with this invention. An input terminal 11 receives an input signal 12 which typically has a slowly varying DC amplitude such as provided by a temperature sensing trandsucer, an air pollution sampling transducer, an electronic wattmeter output, and the like.

In the embodiment shown in FIG. 1 the input signal 12 is a negative DC voltage signal, however, it is to be understood that the circuit can be modified to accept a positive direct current voltage or to accept a positive and negative going signal with the use of a constant bias source. For purposes of this description the input signal 12 is shown with a relatively low negative level portion 12A and a relatively high negative level portion 12B which occurs at a relative long time after the portion 12A since the input signal 12 is typically slow varying.

An input resistor 14 is connected in series with the input terminal 11. A storage capacitor 16 receives charging current proportional to the voltage level of the input signal 12 and is connected to an operational amplifier 17 between the inverting input thereof and the output 18 to form an integrator circuit 19. The non-inverting input of the operational amplifier 17 is connected to a bias resistor 20 connected to ground. The terminal 11, resistor 14, and the integrator 19 form a charging circuit for the capacitor 16 which provides a substantially linearly increasing charge on the capacitor 16 in response to the voltage level of the input signal 12. The rate of capacitor charging is directly proportional to the input signal level. The integrator output 18 develops a voltage corresponding to the charge stored on the capacitor 16.

A discharge circuit is connected to the integrator circuit and the capacitor 16 at a summing junction 21 and includes a reference voltage discharge source 22 with the positive pole thereof connected toward the junction 21 by an adjustable discharge resistor 23, and a solid state switch 24. The negative pole of the reference voltage source 22 is grounded and the adjustable resistance 23 is varied to provide a constant desired discharge current. The solid state switch 24 includes an FET transistor 28 in series between the junction 21 and the resistor 23. A biasing resistor 29 is connected between the source and gate of the transistor 28 and the source is connected through a diode 30 to ground. The gate of the transistor 28 is connected to a switching control input conductor 32 for receiving bias voltages operative to render the solid state switch to either the conductive or non-conductive state and therefore serve to connect and disconnect the voltage source 22 and render the discharge circuit selectively operative to discharge the capacitor 16.

The integrator circuit output 18 is connected through a resistor 33 to the input of a comparator 35 formed by an operational amplifier 36 having a Zener diode 37 connected between the output 38 and the inverting input of the operational amplifier 36. The noninverting input of the operational amplifier is connected to a bias resistor 39 connected in series with ground. The comparator 35 is operative to be responsive at a comparator reference level corresponding to a predetermined charge level of the capacitor 16. The output 38 is at a high or more positive voltage value when the charge on the capacitor 16 is below the predetermined charge level and has a low or more negative voltage value when the capacitor charge is above the predetermined charge level.

It is noted that discharge current is opposed by the charging current at the summing junction 21, however, the high gain characteristic of the operational amplifier 17 makes the inverting input, which is connected to the junction 21, a virtual grounded potential. Accordingly, the different levels of the input signal and corresponding charging currents are not effective to vary the constant discharge rate of the capacitor 16. The discharge current is connsidered as the current opposite from the charging current from the virtual ground and is maintained constant and is applied for a fixed portion of the clock pulse period.

A decision control logic circuit 41 receives the comparator output 38 to provide a decision making operation if capacitor discharge is required. A clock pulse source 42 having CLOCK and $\overline{\text{CLOCK}}$ squarewave logic pulse outputs 43 and 44 to synchronize the response of the decision control logic 41, to control the switching of the solid state switch 24, and to develop the output of the converter 10. Opposite logic states of the clock pulse source define fixed clock pulse portions establishing decision making and discharge command cycles of operation as described in detail hereinbelow.

The decision control logic 41 includes a positive logic two input NAND gate 46 receiving the $\overline{\text{CLOCK}}$ output 44 and the comparator output 38. The output 47 of the gate 46 is connected to one input of a NAND gate 48 also having the second input thereof connected to the $\overline{\text{CLOCK}}$ output 44.

The gate output 49 and the gate output 47 are connected to the set and reset inputs, respectively of a latch circuit formed by two NAND gates 50 and 51. The outputs 52 and 53 of the gates 50 and 51, respectively, are cross-coupled to an input of the other latch circuit gate with the other input of the gate 50 connected to the gate output 49 and the other input of the gate 51 connected to the gate output 47. The output 52 of the gate 50 forms one output of the decision control logic 41 and the output 53 of the gate 51 forms a second output of the logic 41. A 0 logic state at the output 53 provides a discharge control logic signal to enable a discharge cycle of the capacitor 16.

A two input NAND output gate 54 has one input receiving the output 52 of the logic 41 and the other input is connected to the CLOCK output 43. The output 55 of the gate 54 generates the output pulse output of the converter 10. The output pulses are generated in response to each discharge cycle. It is contemplated that other points in the circuit which are responsive to each discharge cycle may be used to trigger a pulse generating circuit to produce the output pulses.

A discharge command circuit 56 is connected between the switching control input 32 of the solid state switch 24 and both the output 53 of the logic 41 and the CLOCK output 43. A PNP transistor 57 forms a gating and biasing control element within the circuit 56 for driving the transistor 28 in the solid state switch circuit 24 to the conductive state. The base of the transistor 57 is connected to a resistor 58 to the logic output 53. The emitter of the transistor 57 is connected by a diode 59, having the polarity indicated, to the CLOCK output 43. A voltage source 62 in the discharge command circuit 56 is connected between ground and the collector of the transistor 57 through resistor 63 at the junction 64. The voltage source 62 supplies a negative voltage at the junction 64 through resistor 63 with respect to ground. A switching diode 65 is connected between the junction 64 and the switching control input 32 and is connected in the direction of polarity indicated.

The discharge command circuit 56 maintains the solid-state switch 24 non-conductive when the transistor 57 is non-conductive so that the diode 65 is biased in the forward direction and the junction 64 applies a minus voltage to the gate of the transistor 28 to bias it off. The transistor 57 is biased conductive when the decision control logic output 53 is in the negative or 0 logic state to provide the discharge control signal and the CLOCK is in the more positive or 1 logic state, the junction 64 becomes slightly positive. This reverse biases the diode 65 causing the gate to source voltage of the transistor 28 to go to a substantially zero voltage level and become conductive thereby rendering the discharge circuit operative to discharge the capacitor 16.

The output gate 54 supplies the output pulse of the converter 10 at the output 55 to a suitable indicating device such as a conventional counter 66 which is not part of this invention. The counter 66 provides the average frequency of the output pulses over a relatively long time base interval determined by a time base generator. The CLOCK output 43 is connected to the generator 67 which includes a counter triggered by the CLOCK signals. A generator output indicated timing pulses defining a time reference of several hundred thousands of CLOCK periods for precision measurement. The output 55 further may be connected to a recording or totalizing system as described hereinbelow with connection with the description of FIG. 2.

Before describing the detail operation of the circuit of the converter 10 as illustrated in FIG. 1 the general operational features are described to better understand the detail circuit operation. It is to be understood that the pulse rate referred to herein as an indication of the level of the input signal 12 is the average frequency of the output pulses at output 55 taken over a long time interval with respect to the interval of a single output pulse at a given input signal level. Since the output pulses have a constant duration they occur randomly at a frequency of occurrence proportional to input signal level and at every instant the capacitor is discharged. Therefor, the average frequency of the output pulse is also the average period of complete output pulse cycles taken over a long time interval as measured by the time base counter 67.

We believe an analogy is helpful in understanding this invention by considering the capacitor 16 equivalent to a large tank being filled by a liquid having a flow rate equivalent to the level of the input signal 12. A predetermined level of the tank corresponds to the predetermined charge level of the capacitor 16. The liquid flow in is determined by the amount of the liquid removed from the tank to maintain the liquid at the predetermined tank level over a given time interval. The rate at which the tank level would be viewed to decide whether liquid is to be removed is provided in the decision control logic 41 during one fixed portion of the clock pulses from the source 42. For example, when the CLOCK output 43 is in the 0 logic state a decision cycle occurs. If the comparator output 38 indicates a logic state, such as the 0 state, when the capacitor charge is above the predetermined level, the 0 state of the CLOCK signal causes a decision by the logic 41 to discharge the capacitor 16. The other fixed portion the CLOCK signal is provided when it is in the 1 state and establishes a discharge command cycle if the decision has been made to discharge. The discharge cycle is controlled by the discharge command circuit 56 and removes the capacitor charge at a fixed rate since the discharge current is constant and is applied for a fixed time which is the fixed portion of the CLOCK signal when in the 1 logic state. This corresponds to taking a constant amount of liquid from the tank of the analogy each time it is decided that liquid must be removed.

Accordingly, if the output pulse rate is measured over a time base interval of 1,000 clock periods, for example, and if 500 discharge cycles, each providing an output pulse, are need to balance the charge on the capacitor 16 then the voltage level of the intput signal 12 would be one half its maximum level. Since the clock pulse source 42 and the time base counter 67 are tied to the common clock pulse frequency any change of the clock pulse frequency proportionally changes the time base interval without effecting the converter accuracy since the ration of capacitor discharge cycles to the time base interval will remain proportional.

Figure 3A:
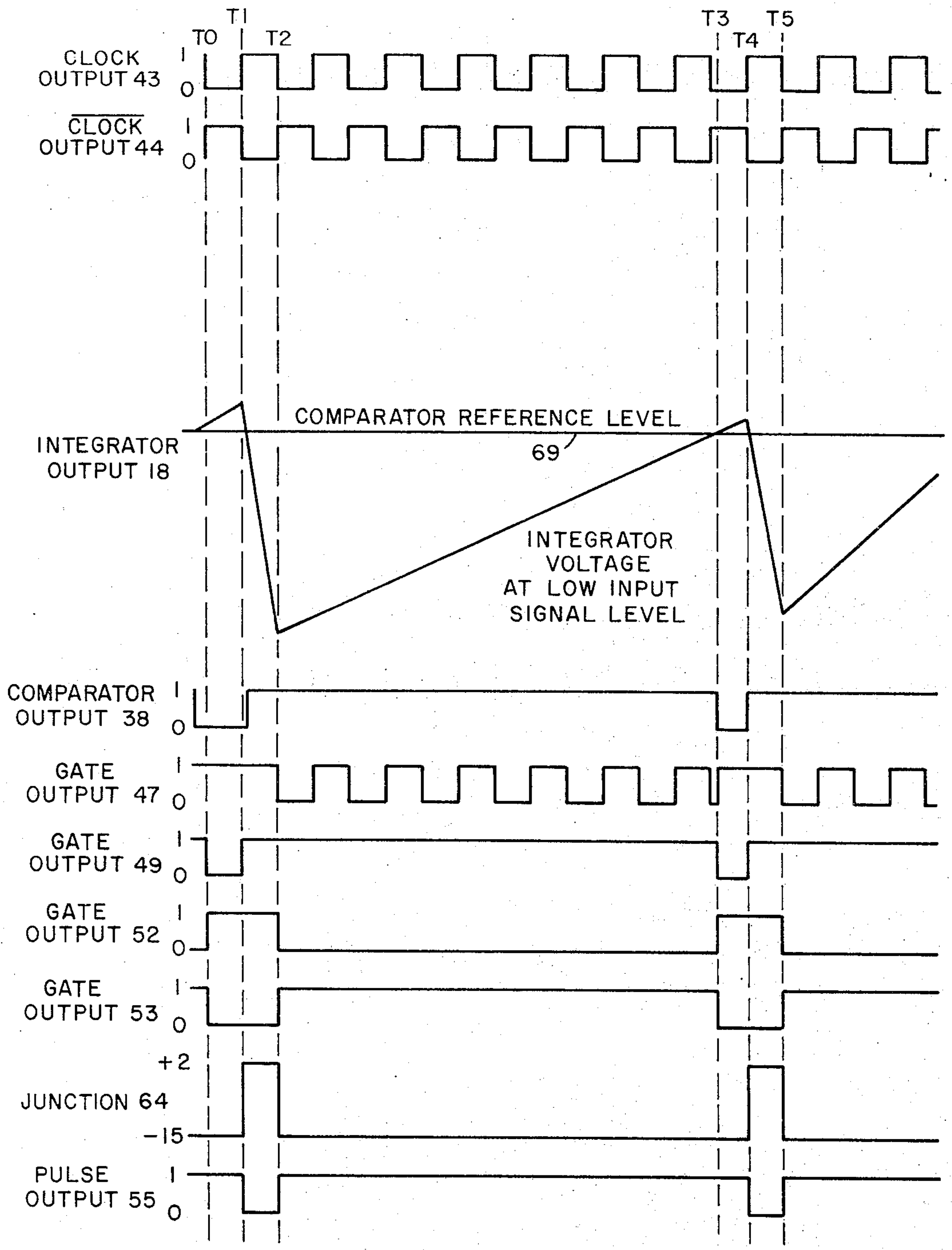
FIGS. 3*a* and 3*b* are timing diagrams of signals occurring at designated locations of the circuit shown in FIG. 1 for two relatively low and high levels of an input signal.
Figure 3B:
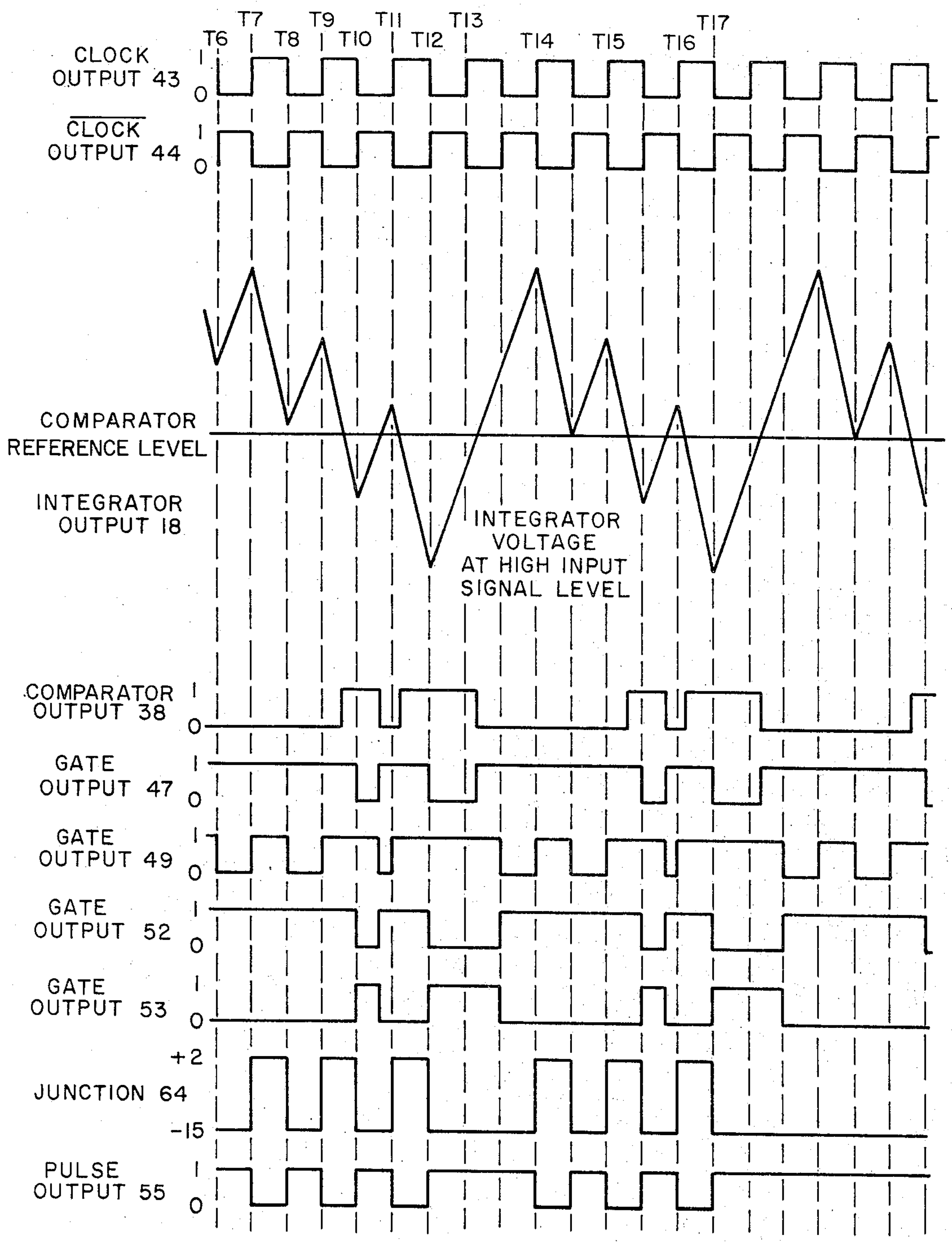

The detail operation of the analog to pulse rate converter 10 is described in connection with the timing diagrams of FIGS. 3A and 3B illustrating the voltage waveforms occurring at the designated locations in the circuit illustrated in FIG. 1. The first vertical series of time graphs of waveforms in FIG. 3A indicate a condition when the input signal has a low level portion 12A of approximately 15 percent of the maximum input level of the converter 10 and the similar graphs of waveforms in FIG. 3B indicate the input signal level when at a high level portion 12B approximately 75percent of the maximum input signal level. The top two graphs indicate the CLOCK and $\overline{\text{CLOCK}}$ outputs 43 and 44 indicating the square wave waveform where the most positive portion is a 1 logic state and the most negative level is a 0 logic state. The positive and negative portions of the clock pulses do not necessarily have an equal duty cycle, however, the proportionality must remain constant. In the preferred embodiment shown the duty cycles are equal. This provides a discharge cycle having a time interval equal to one-half of a clock period.

The third waveform graph indicates the integrator circuit output 18 with respect to the comparator circuit reference level 69 which corresponds to the predetermined charge level of the capacitor 16. The fourth waveform graph indicates the output 38 of the comparator circuit 35 which has a more positive or 1 logic state developed whenever the voltage level of the integrator output 18 is below the comparator reference level 68 and has a 0 logic state when the integrator output 18 is above the level 69. The fifth waveform graph illustrates the logic states occurring at the output 47 of the gate 46. The sixth graph indicates the logic state of the output 49 of the gate 48 and the seventh and eighth graphs indicate the logic states of the decision control logic outputs 52 and 53, respectively. The ninth graph indicates the voltage levels occurring at the junction 64 which has a most positive level of approximately +2 volts in the preferred embodiment illustrated to bias the solid-state switch 24 in the conductive state and has a most negative voltage level of approximately −15 volts to bias the solid state switch 24 to the non-conductive state. The last time graph of waveforms indicates the output pulses from the convertor 10 occurring at the output 55 of the gate 54.

The time TO in FIG. 3A is taken when the converter 10 is operating when the input signal 12 is being received having a level of approximately 15 percent of the maximum input level and charges the capacitor beyond the comparator reference level 68. At the time TO, the CLOCK and $\overline{\text{CLOCK}}$ outputs 43 and 44 go to the 0 and 1 logic states, respectively, to start a decision making interval. During the time between TO and T1 the solid-state switch 24 will be non-conductive and the comparator output 38 will already be changed from the 1 to the 0 state as the output 18 reaches the level 69. At time T1 the CLOCK pulse goes from the 0 to the 1 state to start a discharge command interval. The gate output 47 remains at the 1 state regardless of the state of the $\overline{\text{CLOCK}}$ state. This 1 state at the input to the gate 48 enables it so that each 1 state of the $\overline{\text{CLOCK}}$ places the output 49 at the 0 state and then returns to the 1 state when the $\overline{\text{CLOCK}}$ goes to the 0 state. The latch circuit of gates 50 and 51 is triggered at the half clock cycle at time TO so that the output 52 is at the 1 state and the output 53 is at the 0 state. At time T1 the CLOCK logic 1 state biases the transistor 57 conductive to in turn reverse bias the diode 65 and turn on the solid state switch 24. This begins the discharge cycle for the interval of one-half of the clock period. The output 52 at time T1 is in the 1 state so as to enable the gate 54 which develops a 0 state pulse with the 1 state CLOCK input at time T1. This 0 state pulse provides the converter output pulse. The time T2 occurs at the end of the 1 state of the clock period which provides a discharge cycle between times T1 and T2 sufficient to bring the charge on the capacitor 16 substantially below the comparator reference level 69. The comparator output 38 has returned to the 1 state enabling the gate 46 so that the $\overline{\text{CLOCK}}$ pulses are inverted at output 47 to cause the output 47 to have the same state as the CLOCK pulses. Upon the output 47 going to the 0 state at time T2, the input to the gate 51 goes to the 0 triggering the outputs 52 and 53 to the 0 and 1 states. With the CLOCK going to the 0 state the transistor 57 in the switch control circuit 56 causes the junction 64 to go to the negative level and render the solid-state switch 24 non-conductive.

The decision logic control 41 provides a check to see if the integrator output 18 did drop below the reference level 69 and develop a 1 state at the output 38 of the comparator 35. If it did, as occurred between times T1 and T2, the latch circuit is triggered as just described and the 0 state on the output 52 inhibits further output pulses from the output 55. The latch circuit arrangement effectly memorizes that no more discharge cycles are to occur between T2 and T3.

The capacitor 16 is again charged by the input signal 12 and continues to accumulate charge for a period slightly over six complete CLOCK periods following time T2 in accordance with the input signal level. At time T3 the predetermined charge level on the capacitor 16 is reached, causing the comparator output 38 to go to the 0 state. This inhibits the gate 46 so that the output 47 will be made to go to the 1 state and enable the gate 48 so that the output 49 goes to the CLOCK or inverted state of the $\overline{\text{CLOCK}}$ state and the 0 state at time T3. This triggers the latch circuit so that the gates 50 and 51 are triggered and the outputs 52 and 53 are placed at the 1 and 0 states, respectively. This enables the discharge command circuit 56 such that at the time T4 the 0 to 1 transition of CLOCK pulse turns the solid-state switch 24 conductive to initiate a discharge cycle for the interval of one-half the clock period ending at time T5. This is indicated in the graph at the junction 64 and the corresponding pulse output is developed at the output 55. At the end of the discharge cycle at time T5 the operation as just described in repeated.

In FIG. 3B the input signal is taken at a level substantially 75 percent of maximum, as noted hereinabove. At the time T6 occurring for example after the time shown in FIG. 3A, the capacitor 16 has just completed a discharge cycle, however the charge remains above the predetermined charge level, as indicated by the graph of signals at output 18 being above the comparator reference level 69, at the time T6. Therefore, the comparator output 38 remains in the 0 state. The gate output 47 is held at the 1 state to enable the gate 48 to be triggered by the $\overline{\text{CLOCK}}$ pulses and the latch circuit is held in a constant state with a 1 state at the output 52 and a 0 state at the output 53 or memorizes that a discharge command is required. This maintains the output gate 54 and the discharge command circuit 56 in an enabled condition such that each 1 interval of the CLOCK period at time T7, T8 and T11 initiates a discharge cycle and an output pulse from the output 55. This continues through the times T7, T8, T9, T10, T11 and T12 when the charge on capacitor 16 reaches or drops below the charge reference level 16 during equal discharge cycles which remove equal amounts of charge in the quantized discharge cycles. However, the following charging cycle after times T6, T8 and T10 raises the capacitor charge above the predetermined charge level.

At time T12 the end of three consecutive discharge cycles after time T6 is reached so as to produce three output pulses between time T6 and time T12. The capacitor 16 is charged between times T12 and T13 which is the next CLOCK pulse 0 to 1 transition following time T12. At this time the comparator output 38 remains at the 1 state since the comparator reference level 68 has not been reached by the output 18. Accordingly, the discharge command circuit 56 remains in the non-conductive state and the capacitor 16 continues to charge to the time T14 which is the first 0 to 1 transition of the CLOCK pulse following the output 18 going above the comparator reference 69. At the time T14 the discharge cycle is initiated and again three consecutive discharge cycles occur to produce output pulses at times T14, T15 and T16 with the latter pulse ending at time T17.

Accordingly, it is seen that in the seven clock periods occurring between time T1 and T4, one output pulse was produced and in the seven clock periods between time T6 and time T17, six output pulses were produced at the output 55 in response to the differences in the input signal levels. The counter 66 shown in FIG. 1 averages the rate of output pulses provided at the output 55 relative to the reference time interval produced by the time base generator 67 to give a visual or permanent record of the level of the input voltage 12.

Referring now to FIG. 2 there is shown an alternative system utilizing the enalog to pulse rate converter 10 of this invention. The system corresponds to the totalizing or data logging system 70 including a magnetic tape recorder as described in U.S. Pat. No. 3,148,329 issued Sept. 8, 1964 for a Quantity Measuring Apparatus Using A Pulse Recorder, and assigned to the assignee of this invention. In this system, quantized data pulses 74 are recorded on a magnetic tape 75 from a record head 76 connected to a data pulse amplifier 77. A timing pulse amplifier 78 is connected to a record head 79 to record timing pulses 80 generated by a source 89 at regular intervals such as every 15 minutes on the tape 75. This provides the time base interval for averaging the data pulses. In the aforementioned patent, the data pulse amplifier is connected to a pulse initiator associated with a watthour meter so that each data pulse 74 produced at the record head 76 represents 1 kilowatt hour, for example. The recorder is operated over extended periods, for example, 1 month so that the pulses may be totalized and analyzed to determine total power as well as periods of peak power consumption.

The converter 10 of this invention is connected with the output pulses at the output 55 being applied to a divide-by-32 counter 82 which produces a repetition rate variable with the input signal level in response to the output pulses produced at the output 55. These pulses are applied through the data pulse amplifier 77 to be recorded on the tape 75. The clock pulse source 42A is one specific embodiment of the corresponding clock pusle source 42 shown in FIG. 1 to produce CLOCK and $\overline{\text{CLOCK}}$ logic signals. The source 42A is synchronized to the frequency of the timing pulse amplifier 81 producing the timing pulses 80 on the tape record 75. Often, a 60 Hz. power line frequency is used to develop the recorded timing pulses 80 at the 15 minute intervals. The same 60 Hz. AC signals are applied to a transistor 84 in the clock pulse source 42A at a filtering input circuit 85 connected to the transistor 84. The transistor 84 is triggered by each positive cycle of the 60 Hz. power line frequency to produce a pulse from the inverter gate 87. A flip-flop circuit 89 is connected to the inverter gate output 88 so as to be triggered by every other pulse signal at the gate output 88. This produces a clock pulse rate of 30 Hz at the CLOCK and $\overline{\text{CLOCK}}$ outputs 91 and 92 corresponding to the outputs 43 and 44 in FIG. 1. The divide-by-32 counter is used to reduce the output pulse rate to less than one pulse per second maximum or 15/16 pulse out per second maximum to accommodate the recording rate of the system 70. Accordingly, the same synchronization of the timing pulses establishing the time base interval of the data recording system 70 is used to synchronize the output pulse rate of the converter 10 producing the data pulses 74 being recorded.

Utilizing clock pulses at the 30 Hz. rate and because the positive and negative cycles of the clock pulses are equal, the discharge cycle will always be one-half of the clock period of 1/30th of a second or discharge is 1/60th of a second duration in the system illustrated in FIG. 2.

While the embodiment of the present invention as disclosed herein constitutes a preferred form it is to be understood that other forms may be adopted within the spirit and scope of this invention.

What is claimed is:

1. An analog to pulse rate converter comprising:
- an input for receiving a varying analog input signal;
- an integrator circuit having a charging and discharging capacitor;
- a charging circuit connected between said input and the integrator capacitor for applying a charging current at a linear rate proportional to the level of said input signal;
- a discharge circuit connected to said capacitor, said discharge circuit including a source of constant discharge current and a solid-state switch having conductive and non-conductive states, said capacitor being normally charged by said charging current when said switch is in said non-conductive state being discharged by said discharge current when said solid state switch is in said non-conductive state;
- a source of clock pulses for generating clock pulses having fixed portions of opposite levels defining first and second logic states;
- a decision control logic circuit including first and second inputs, said first input being responsive to a predetermined charge level developed on said capacitor, said second input being responsive to said first clock logic state so as to produce a discharge control logic signal when said first clock logic state occurs after said capacitor is charged above said predetermined level;
- a discharge command circuit connected to said solid state switch to operate the switch between the conductive and non-conductive states, the command circuit being responsive to said discharge control logic signal and said second clock logic state so as to render the switch conductive when a complete fixed portion of said second clock logic state occurs after said discharge control logic signal is received so as to discharge said capacitor during a discharge cycle equal to the duration of the fixed portion of said second clock logic state;
- an output pulse means for generating output pulses of constant duration in response to each discharge cycle of said capacitor; and
- a time base generator for indicating timing reference intervals corresponding to a predetermined number of said clock pulses whereby the average number of output pulses occurring during each timing interval corresponds to the level of said input signal.

2. The converter as claimed in claim 1 including a comparator connected between said integrator circuit and said first input of said decision control logic circuit, said comparator being responsive to the integrator circuit output voltage for generating a logic signal to said first input when the predetermined charge level of said capacitor is reached.

3. The converter as claimed in claim 2 wherein said decision control logic circuit includes a gating circuit means having two inputs connected to said first and second inputs and two outputs, the logic circuit further including a latch circuit having two inputs each connected to one of said outputs of said gating circuit means and having first and second latch circuit outputs wherein said first latch output produces said discharge control logic signal, and further wherein said output pulse means includes a gating circuit means having an output responsive to said second output of said latch circuit so as to enable said second clock logic state to be generated at the output to form said output pulses.

4. The converter as claimed in claim 2 including a common source of alternating current signals connected to said source of clock pulses and to said time base generator, wherein said time base generator develops timing pulses defining said timing reference intervals, and means responsive to said output pulses and said timing pulses for indicating the average frequency of said output pulses.

5. The converter as claimed in claim 4 wherein said indicating means includes a magnetic recorder having a continuously moving magnetic tape for recording said timing pulses along one tape path and said output pulses along another tape path adjacent said one tape path.

6. The converter as claimed in claim 5 including a pulse counter means connected between said output pulse means and said recorder wherein the pulse counter means generates a pulse in response to a predetermined number of output pulses to accommodate the rate of said output pulses to the recording rate of said recorder.

* * * * *